3,329,331
Patented July 4, 1967

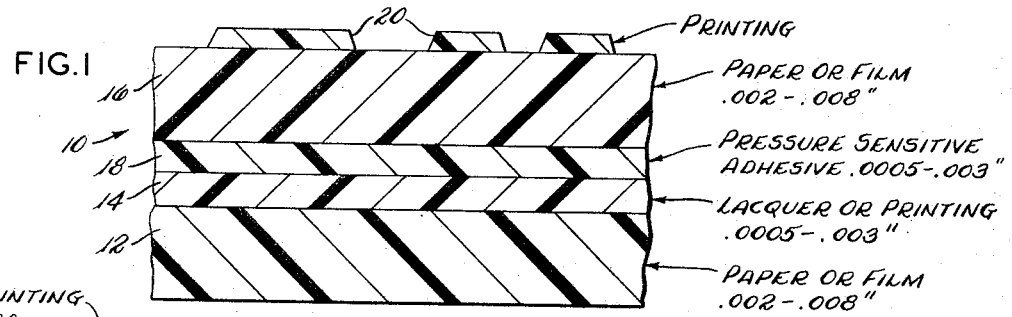
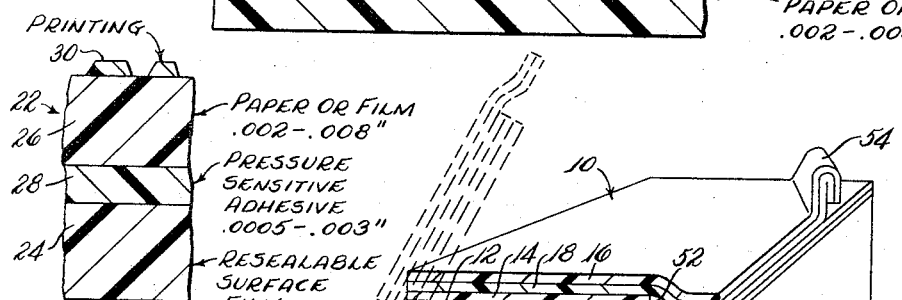
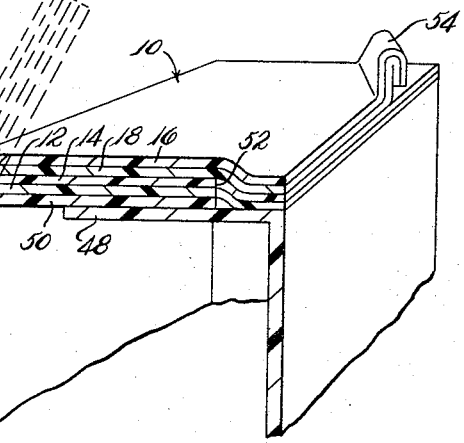
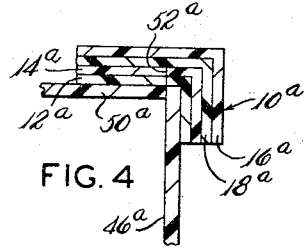
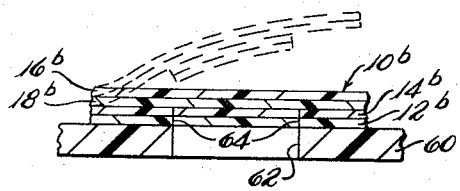
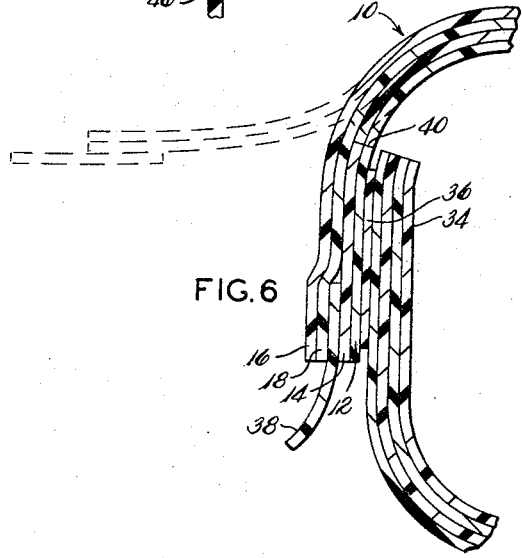
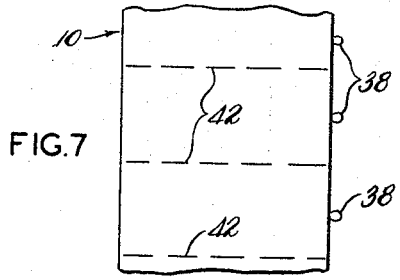
July 4, 1967 — B. D. MORGAN — 3,329,331
RESEALABLE CONTAINERS AND FLEXIBLE LAMINATE THEREFOR
Filed Jan. 9, 1964
INVENTOR.
BURTON D. MORGAN _United States Patent Office_

3,329,331
RESEALABLE CONTAINERS AND FLEXIBLE LAMINATE THEREFOR
Burton D. Morgan, Hudson, Ohio, assignor to Morgan Adhesives Company, Summit County, Ohio, a corporation of Ohio
Filed Jan. 9, 1964, Ser. No. 336,794
5 Claims. (Cl. 229—51)

This invention relates to resealable containers, and to flexible laminates including a pressure sensitive adhesive layer for manufacturing resealable containers, or for use as resealable wrappers for bread or other articles.

Laminates including pressure sensitive adhesives are generally old and well known. However, these laminates have included removable paper backing portions having release coatings thereon which backing portions must be peeled from the pressure sensitive adhesive and discarded in order to expose the pressure sensitive adhesive for use. Laminates including pressure sensitive adhesive layers which are activated by peeling off a paper backing having a release coat engaging the pressure sensitive adhesive layer are not readily adapted to use in resealable containers. The peeled off backing paper bearing the release coat cannot be incorporated into the container for the reason that the pressure sensitive adhesive layer cannot be resealed against the release coat. Moreover, if the problem is approached in the other direction with the release coated backing paper being peeled off and thrown away, the pressure sensitive adhesive layer cannot normally be sealed and resealed against a surface, such as the usual cardboard container, for the reason that the adhesive when once sealed against the surface and then removed will tear off portions of the surface which will stick to the pressure sensitive adhesive layer and make resealing of the container difficult if not impossible.

It is the general object of the invention to avoid and overcome the foregoing and other difficulties of and objections to prior art practices by the provision of an improved resealable container and laminates for use therewith including pressure sensitive adhesive layers, the containers and laminates being characterized by simplicity, low cost, and ease of manufacture with conventional apparatus.

Another object of the invention is to provide resealable containers and laminates for constructing the same wherein the containers are quite tight until opened, are opened readily, and are easily resealed many times.

Another object of the invention is the provision of an improved flexible laminate including a layer of pressure sensitive adhesive, the laminate being adapted to provide a resealable wrapper for bread, or other articles adapted to be directly wrapped in the laminate.

Another object of the invention is to provide a laminate which can be readily incorporated with a cardboard container to provide a simple practical resealable closure for the cardboard container.

The foregoing objects of the invention, and other objects which will become apparent as the description proceeds are achieved by the provision of a flexible laminate for use in resealable containers, said laminate comprising a paper base sheet, a coating of lacquer adhered to the base sheet, a paper surface sheet, a pressure sensitive adhesive layer adhered to the underside of the surface sheet and releasably and resealably adhered to the lacquer coating.

For a better understanding of the invention reference should be had to the accompanying drawings, wherein:

FIGURE 1 is an enlarged fragmentary cross sectional view of a laminate including a pressure sensitive adhesive layer and constructed in accord with the principles of the invention;

FIGURE 2 is a view similar to FIGURE 1 but of a modification of the invention;

FIGURE 3 is an enlarged perspective view, partially in section, of a container incorporating the features of the invention, with the laminate of the invention being illustrated in an exaggerated thickness to better show the details thereof;

FIGURE 4 is a fragmentary sectional view of a modification of the container shown in FIGURE 3;

FIGURE 5 is a fragmentary sectional view of still another container laminate combination of the invention;

FIGURE 6 is a fragmentary cross sectional view illustrating the laminate of the invention, in exaggerated thickness form, employed directly as a wrapper of resealable type for articles, such as bread; and FIGURE 7 is a fragmentary plan view, on a reduced scale, of a continuous strip of individual wrappers of the type illustrated in FIGURE 6.

In the drawings, the numeral 10 indicates generally a relatively thin and flexible laminate, usually having an overall thickness between about .005 and about .015 inch, and made up from a base sheet 12 of a film or paper, preferably paper, having a thickness between about .002 and about .008 inch. On top of the base sheet 12 is a coating of lacquer 14, usually having a thickness between about .0002 and about .003. The lacquer coating 14 may be a thermoset silicone elastomer such as "Syl-off 23," manufactured by Dow-Corning Company of Midland, Mich., or the coating 14 may be provided by printing substantially a continuous coating surface 14 on the base sheet 12 with typical inks based upon cellulose nitrate or the alkyd resins.

The laminate 10 includes a surface sheet 16 of plastic film or paper, preferably paper, of a thickness between about .002 and about .008 inch. The surface sheet 16 has adhered to its undersurface a layer 18 of pressure sensitive adhesive of known standard composition, such as a rubber and resin combination, and this layer is usually between about .0005 and about .003 inch, with the adhesive layer 18 being releasably but resealably secured to the coating 14. The upper surface of the surface sheet 16 is conveniently printed at 20 with any desired subject matter.

Turning now to FIGURE 2 of the drawings, this illustrates a laminate indicated generally by the numeral 22 and including a base sheet 24 of plastic film, usually between about .002 and about .008 inch, the film being of a composition so that the upper surface of the film is sufficiently strong to not tear away from itself when a pressure sensitive adhesive layer is peeled therefrom, and with the surface being adapted to have the pressure sensitive adhesive resealed against it a considerable plurality of times.

The laminate 22 includes an upper or surface sheet 26 of paper or film and having a thickness of between about .002 and about .008 inch to the undersurface of which is adhered a layer 28 of a pressure sensitive adhesive usually having a thickness between about .0005 and about .003 inch which is adhered to the base sheet 24. The surface sheet 26 usually has printing 30 in desired form thereon.

The laminates 10 and 22 are adapted to be directly used to form releasable containers or wrappers. One such embodiment is illustrated in FIGURE 6 wherein the four layer laminate 10 is utilized to provide a sealed wrapper for a loaf of bread, the bread not being shown. In this form of the invention one end of the laminate, called the overlapping end is lapped over the other end of the laminate, called the lapped end 34, and the base sheet 12 of the overlapping end 32 is adhesively secured, as at 36, to the surface sheet 16 of the lapped end 34 of the laminate.

Now in order to open the wrapper thus provided, some means may be included to facilitate peeling the surface sheet 16 and the adhesive layer 18 of the overlapping end 32 away from the lacquer coating 14 and base sheet 12 of the overlapped end 32. Such means may comprise a tab 38 positioned between the adhesive layer 18 and the lacquer coating 14 in the manner shown in FIGURE 6. Pulling on the tab 36 will peel the surface sheet 16 and adhesive layer 18 away from the lacquer coating 14, usually to the position shown in dotted lines in FIGURE 6. This exposes a line of severance 40 in the lacquer coating 14 and base sheet 12 at or adjacent the end of the overlapped end 34 of the laminate. The line of severance 40 takes one of several forms. Either it has been previously cut during the manufacture of the laminate, or else it has been perforated so that the cut can be readily completed by pushing with a finger or a fingernail, or else a score line has been simply printed on the lacquer coating 14 with instructions that a knife be run along the line to effect the cut. Of course, in certain embodiments of the invention it may be possible to provide a tear cord along the line 40 having an end to be gripped by the fingers and pulled to effect the cutting of the base sheet 12 and the lacquer coating 14 on the line 40.

In any event, when the wrapper is opened by moving the overlapping end 32 to the dotted line position shown in FIGURE 6, and with the line of severance 40 open, the contents inside of the wrapper are exposed for the removal of one of more slices of bread, for example, the overlapping ends 32 and 34 being moved away from each other to facilitate this operation. Thereafter, in closing and resealing the wrapper the ends of the wrapper are repositioned over the end of the contents and the overlapping end 32 is moved from the dotted position of FIGURE 6 back to the solid line position and is pressed down into position to reseal the adhesive layer 18 against the lacquer coating 14 and the portion of the base sheet 12 which has been retained by the adhesive 36 on the overlapped end 34 of the laminate. The opening and closing operation described can be repeated any number of times and the contents of the wrapper are kept fresher than might otherwise be possible.

Now turning to FIGURE 7 this illustrates how the laminate 10 may be formed as a continuous strip appropriately perforated or cut on lines 42 into individual wrappers, each wrapper being provided with a tab 38, such as previously described. The continuous strip of FIGURE 7 is of a shape so that it can be fed directly to known apparatus for individually wrapping loaves of bread, for example, which apparatus will apply the adhesive 36 between the overlapping ends of the wrapper during the bread wrapping operation.

Returning now to FIGURE 3, this illustrates a cardboard box 46, for packaging cereal, or the like, the cardboard box usually having printing and designs, not shown, on its outer surface. The box 46 has flaps 48 and 50 overlapping each other to close the top of the box. Over the top of the box 46, and covering the flaps 48 and 50 is positioned a strip of the laminate 10 of the invention. The upper or surface sheet 16 of the laminate 10 will be printed in colors and design so that it ties in with the printing on the rest of the box 46, and the base sheet 12 of the laminate is adhesively secured to the top of the box and specifically to the flaps 50 and 48 in the manner illustrated. The overall thickness of the laminate 10 is usually less than the wall thickness of the cardboard of the box 46 so that the appearance of the box is in no way impaired.

A score or severance line 52 is provided in the base sheet 12 and lacquer coating 14 along the edge of the flap 50 over the full length of the flap, this line 52 taking any of the forms already described in conjunction with the line 40 of FIGURE 6. At one end or corner of the laminate 10 the surface sheet 16 and adhesive layer 18 may be folded back on itself to provide a tab 54. This may be done to the laminate before it is applied to the box 46, or provision can be made so that the customer will do this prior to opening the box. In any event, by gripping the tab 54 the surface sheet 16 and adhesive layer 18 can be peeled away from the lacquer coating 14 and the base sheet 12 adhering to the flap 48 which then allows the flap 50 to swing up to the dotted line position shown. This allows the flap 48 to be moved upwardly also to effect the full opening of the box 46. To reseal, the flap 48 is moved back to horizontal position and the flap 50 is folded down over top of it and the surface sheet 16 and adhesive layer 18 is pressed down against the lacquer coating 14 and base sheet 12 on flap 48 to effect the resealing of the box.

In the form of the invention shown in FIGURE 4, this very similar to that illustrated in FIGURE 3 except that the laminate 10a has been extended over the vertical edge of the box 46a, and the top of the box is closed by a single flap 50a whose edge engages with the vertical side of the box. The cut or line of severance 52a through the lacquer coating 14a and the base sheet 12a is at the edge of the flap 50a. The surface sheet 16a and adhesive layer 18a of the laminate 10a is then resealable in a lateral direction rather than in a vertical direction.

In FIGURE 5 is illustrated still another embodiment of the invention wherein a container 60 is provided with a hole 62 therein, the hole being covered by a laminate 10b. The laminate 10b has its base sheet 12b adhesively secured to the container 60 by means not shown and the base sheet 12b and the lacquer coating 14b are provided with cut lines 64 around the hole 62 so that when the surface sheet 16b and adhesive layer 18b are peeled away to the dotted line position shown the container 60 is opened to have the contents thereof poured through the hole 62. At any time the container can be resealed by pressing the surface sheet 16b and adhesive layer 18b back to the solid line position of FIGURE 5 from the dotted line position.

While a certain respresentative embodiment and details have been shown for the purpose of illustrating the invention, it will be apparent to those skilled in this art that various changes and modifications may be made therein without departing from the spirit or scope of the invention.

What is claimed is:

1. A wrapper for an article to be packaged comprising a flexible laminate extending around the article, said laminate including a base sheet, a coating of lacquer adhered to the base sheet, a surface sheet, a pressure sensitive adhesive layer adhered to the underside of the surface sheet and releasably and resealably adhered to the lacquer coating, said laminate having its ends overlapped, means securing the base sheet to the surface sheet in the region of the overlapped ends, said base sheet and lacquer coating being severed in the overlapping end of the laminate on a line adjacent the lapped end of the laminate, and tab means secured to and extending from the overlapping end of the laminate to facilitate peeling only the surface sheet and adhesive coating of the overlapping end away to leave the lacquer coating and base sheet on the surface sheet of the lapped end of the laminate, said tab means being secured to the overlapping end by being interlaminated therewith.

2. The combination in a resealable package of a cardboard container having a flap movable to and from closure relation with the container, a flexible laminate glued to the container and flap and protruding beyond the movable edge of the flap, said laminate including a flexible base sheet glued as aforesaid, a lacquer coating on the base sheet, an outermost surface sheet, and a pressure sensitive adhesive layer adhered to the surface sheet and releasably and resealably secured to the lacquer coating, means for facilitating peeling away the surface sheet and adhesive layer from the lacquer coating to expose a shear line on the lacquer coating along the edge of the flap, said lacquer coating resealably receiving the adhesive layer and surface sheet after the flap has been opened and shut at the shear line.

3. The combination in a resealable package of a cardboard container having a flap movable to and from closure relation with the container, a paper laminate glued to the container and flap covering the movable edge of the flap, said laminate including a paper base sheet glued as aforesaid, a lacquer coating on the base sheet, an outermost surface sheet, and a pressure sensitive adhesive layer adhered to the surface sheet and releasably and resealably secured to the lacquer coating, said lacquer coating and base sheet being severed along the edge of the flap so that on opening the container the surface sheet and adhesive layer can be peeled away from the lacquer coating and base sheet leaving these on the container, one corner of the laminate having the surface sheet and the adhesive layer folded back on itself to provide a pull tab to facilitate peeling the surface sheet and adhesive layer away from the lacquer coating and base sheet.

4. The combination defined in claim 2 wherein the portion of the laminate glued to the flap extends at right angles to the portion of the laminate glued to the container.

5. The combination in a resealable package of a container having a hole therein, a laminate having a base sheet glued to the container and covering the hole, a lacquer coating on the base sheet, a tear line on the coating around the edge of the hole, a surface sheet, and a layer of pressure sensitive adhesive on the surface sheet and releasably and resealably securing the surface sheet to the lacquer coating on the base sheet.

References Cited
UNITED STATES PATENTS

| | | | |
|---|---|---|---|
| 2,063,999 | 12/1936 | Harrison. | |
| 2,317,223 | 4/1943 | Rottman | 229—37 |
| 2,515,423 | 7/1950 | Ptasnik. | |
| 2,745,592 | 5/1956 | Steck | 229—51 |
| 2,800,214 | 7/1957 | Symonds | 161—406 X |
| 2,816,665 | 12/1957 | Crozier et al. | 161—406 |
| 2,882,183 | 4/1958 | Bond et al. | 161—406 |
| 3,028,280 | 5/1962 | Hoffman | 161—406 X |
| 3,154,329 | 10/1964 | Madsen | 285—239 |
| 3,259,507 | 7/1966 | Smith | 99—172 |

JOSEPH R. LECLAIR, *Primary Examiner.*

FRANKLIN T. GARRETT, GEORGE O. RALSTON,
*Examiners.*

V. A. TOMPSON, D. T. MOORHEAD,
*Assistant Examiners.*